United States Patent [19]
LeBlanc

[11] Patent Number: 5,979,355
[45] Date of Patent: Nov. 9, 1999

[54] TAIL FLAG ASSEMBLY FOR POLE TRAILER

[76] Inventor: Michael LeBlanc, P.O. Box 637 20 Rue Acadie, Richibucto, New Brunswick, Canada, E0A 2M0

[21] Appl. No.: 08/927,652

[22] Filed: Sep. 11, 1997

[51] Int. Cl.⁶ .................................................. B61L 15/00
[52] U.S. Cl. ......................... 116/30; 116/35 R; 116/173; 40/591; 248/512
[58] Field of Search .................................. 116/30, 28 R, 116/35 R, 173, 174, 175, DIG. 7; 40/590, 591, 604; 248/512, 230.9, 541; 211/45; D11/108, 165, 166, 168, 170, 172, 181, 182; 411/400

[56] References Cited

U.S. PATENT DOCUMENTS

| | | | |
|---|---|---|---|
| 124,933 | 3/1872 | Cary | 411/400 |
| 1,787,150 | 12/1930 | Gerow et al. | 116/173 |
| 1,819,768 | 8/1931 | Coffing | 116/173 |
| 1,893,585 | 1/1933 | Hogan | 116/173 |
| 2,101,163 | 12/1937 | Wolfe | 116/173 |
| 2,802,443 | 8/1957 | Hanson | 116/173 |
| 3,209,722 | 10/1965 | Thomsen | 116/173 |
| 3,678,886 | 7/1972 | Tibbet | 116/173 |
| 5,403,219 | 4/1995 | Ryan | 116/173 |
| 5,423,281 | 6/1995 | Crookham et al. | 116/173 |
| 5,481,244 | 1/1996 | Dicke | 116/30 |

FOREIGN PATENT DOCUMENTS 645710  7/1962  Canada .

*Primary Examiner*—Andrew Hirshfeld
*Attorney, Agent, or Firm*—Mario D. Theriault

[57] ABSTRACT

A tail flag assembly for installation on a rear end of an utility pole laid on a pole trailer. The tail flag assembly comprises a ring mountable over the rear end of the pole and a plurality of screws extending radially through the ring for clamping the ring onto the rear end of the pole. The tail flag assembly also comprises a plurality of staffs affixed to the ring and extending outwardly tangentially from the ring, with each staff having a rectangular brightly coloured flag affixed thereto. In one aspect of the invention, each flag has a stripe sewn thereon. The stripe is made of a highly light-reflecting material. The stripe is sewn on a first side of the flag from an upper outside corner thereof to a midpoint on the hem thereof, and on the other side of the flag, from a midpoint on the hem to the lower outside corner thereof. When the flag flaps back and forth, the movement of the stripe simulates a flashing light bar when seen at night under the reflection of the headlights of a vehicle for example. In another aspect of the invention, each staff is made of a flexible material and is pliable for engagement under the crossbar handle of one of the screws. Hence, when all staffs are bent and engaged under a respective crossbar handle, the tail flag assembly is compact in size and easily stowed in a tool compartment of an utility truck.

20 Claims, 4 Drawing Sheets

TAIL FLAG ASSEMBLY FOR POLE TRAILER

FIELD OF THE INVENTION

The present invention relates to a warning flag assembly designed for attachment to the end of an utility pole laid on a pole trailer and more particularly, the present invention relates to a warning flag assembly having a plurality of spaced-apart highly visible flags each having a staff extending away from the longitudinal axis of the pole.

BACKGROUND OF THE INVENTION

Utility poles carried on a pole trailer typically extend 50 feet or more behind a truck of an utility company. Although the truck is highly visible and normally has operating flasher lights when driving, the far ends of the poles represent a safety hazard for the following vehicles.

The image projected by the far end of a pole to a following driver is relatively small as compared to the size of the trailer and of the truck. Therefore, the background view of the truck and trailer to the following driver, can at times cause the illusion that the far end of the pole is further away than it actually is.

Similarly, the driver of the utility truck can misestimate the actual distance of the far end of the pole, especially when the pole is aligned with a line of sight of the driver. These misjudgements often result in backing the pole against nearby structures, fences and other vehicles for examples.

Different types of warning flags have been developed in the past and are still used nowadays for increasing the visibility of the far end of a pole carried on a pole trailer. As a first example, a very popular method for making such warning flag comprises the wrapping a red cloth around a wood stake and nailing the wood stake to the far end of the pole. The red cloth normally lays on the upper surface of the pole or hangs down alongside the pole. In both cases, the flag is hardly visible by the driver of the truck pulling the trailer. Moreover, when the truck is moving at a low speed, or when it is stopped for example, the flag hangs in folds and creases and is hardly visible by the driver of the vehicle following the pole trailer.

A second example of the warning flags of the prior art is illustrated in U.S. Pat. No. 3,678,886 issued on Jul. 25, 1972 to James W. Tibbet. This warning flag is attached to the pole by means of an elastic cord wrapped around the end of the pole. Although this flag always hangs in a fully deployed mode, it normally hangs under the far end of the pole and is not visible by the driver of the truck pulling the trailer.

Yet another example of a tail flag for vehicle is illustrated in Canadian Patent 645,710 issued on Jul. 31, 1962 to Gordon Stanley. This tail flag comprises a C-clamp which is attachable to the load extending behind a vehicle and a U-shaped rod welded to the C-clamp for attaching a red cloth thereto. The flag of this device also hangs down under the load where it is hardly visible to the driver of the vehicle carrying the long objects.

SUMMARY OF THE INVENTION

In the present invention, however, there is provided a tail flag assembly for installation on a rear end of an utility pole laid on a pole trailer. The tail flag assembly of the present invention remains visible from various pertinent directions and in various pertinent circumstances.

In a first aspect of the present invention there is provided a tail flag assembly having a ring mountable over the rear end of an utility pole and a plurality of screws extending radially through the ring and inside the ring for clamping the ring onto the rear end of the utility pole. The tail flag assembly also comprises a plurality of equally-spaced-apart staffs affixed to the ring and extending outwardly tangentially from the ring, with each staff having a rectangular brightly coloured flag affixed thereto.

A first advantage of the tail flag assembly of the present invention is that when the tail flag assembly is mounted on the rear end of an utility pole laid on a pole trailer, the flags extend away from the longitudinal axis of the pole in different directions relative to each other and within a plane perpendicular to the axis of the pole. Thus, the area encompassed by the flags extends all around the rear end of the pole. The tail flag assembly of the present invention is thereby visible from great distances and from all angles behind the pole trailer as well as by the driver of the truck pulling the pole trailer. Moreover, when the truck is parked or moving slowly, there are at least one or two flags which are at least halfway deployed causing the tail flag assembly to remain highly visible even in these circumstances.

In accordance to another aspect of the present invention, each flag has a hem along an inside edge thereof enclosing the end of a respective staff. The flag also has a stripe sewn thereon. The stripe is made of a highly light-reflecting material. The stripe is sewn on a first side of the flag from near an upper outside corner thereof to a midpoint on the hem, and on the other side of the flag, from a midpoint on the hem to the lower outside corner thereof.

When the tail flag assembly is mounted on the rear end of a pole laid on a pole trailer and the flags move back and forth from an action of the wind, the stripe on each flag alternates form a first alignment to a second alignment for simulating a flashing light bar when seen at night under the reflection of the headlights of a vehicle for example. This feature is particularly advantageous for increasing the visibility of the tail flag assembly in nighttime conditions.

In accordance to a further aspect of the present invention, the plurality of screws extending radially through the ring and inside the ring, each has a crossbar handle mounted on an outside end thereof for easing a turning of the screw. Each staff is made of a flexible material and is pliable for engagement under the crossbar handle of one of these screws. Hence, when all staffs are bent and engaged under a respective crossbar handle, the tail flag assembly of the present invention is compact in size and easily stowed in a tool compartment of an utility truck.

Other features of the tail flag assembly of the present invention includes the fact that it is easy to install, sturdy and durable and is a simple construction manufacturable at a reasonable cost.

BRIEF DESCRIPTION OF THE DRAWINGS

The preferred embodiment of the present invention will be further understood from the following description, with reference to the drawings in which.

DETAILED DESCRIPTION OF THE PREFERRED EMBODIMENT

Figure 1:
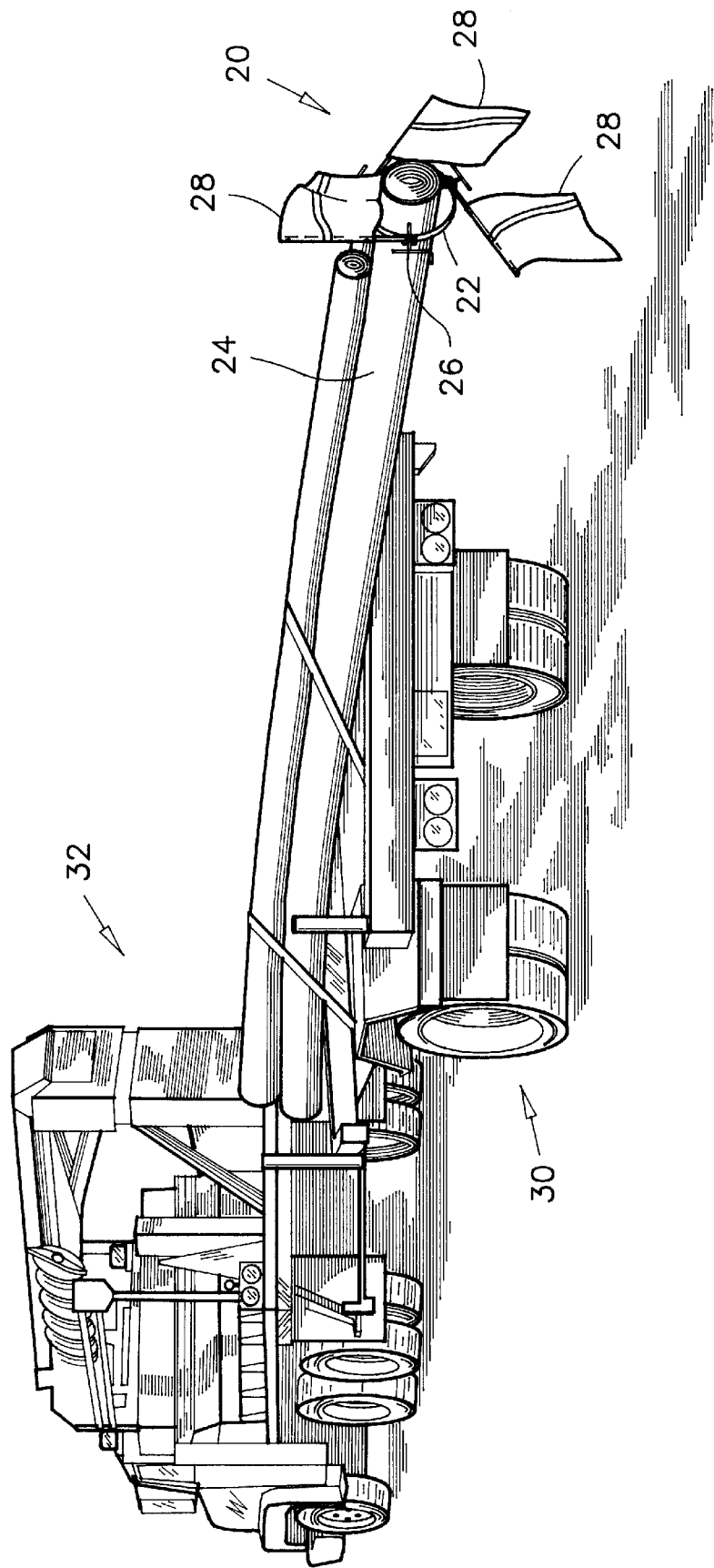
FIG. 1 illustrates the tail flag assembly of the preferred embodiment in use on an utility pole laid on a pole trailer.

The tail flag assembly 20 of the preferred embodiment is illustrated in use in FIG. 1. The tail flag assembly 20 of the preferred embodiment comprises a ring 22 mountable over the far end of a pole 24, with three radial screws 26 extending toward an inside region of the ring and into the surface of the pole. The ring 22 has an inside diameter of about 12½ inches such that it is mountable over the top end of an utility pole 24 having a typical diameter of between 6 to 8 inches.

The tail flag assembly of the preferred embodiment has three flags 28 extending outwardly tangentially relative to the ring 22. The three flags preferably extend at about 120° apart around the ring. Each flag 28 preferably has a surface of one square foot or more and is made of a brightly coloured fabric; preferably coloured bright orange or bright red.

When the tail flag assembly of the preferred embodiment 20 is installed on the far end of a pole 24 being carried on a pole trailer 30, a driver of a vehicle following the pole trailer as well as the driver of the truck 32 pulling the pole trailer 30 can precisely locate the far end of the pole 24. The truck driver has better control over his backing up movements and the following traffic can better evaluate the distance of the far end of the pole relative to their position.

Figure 2:
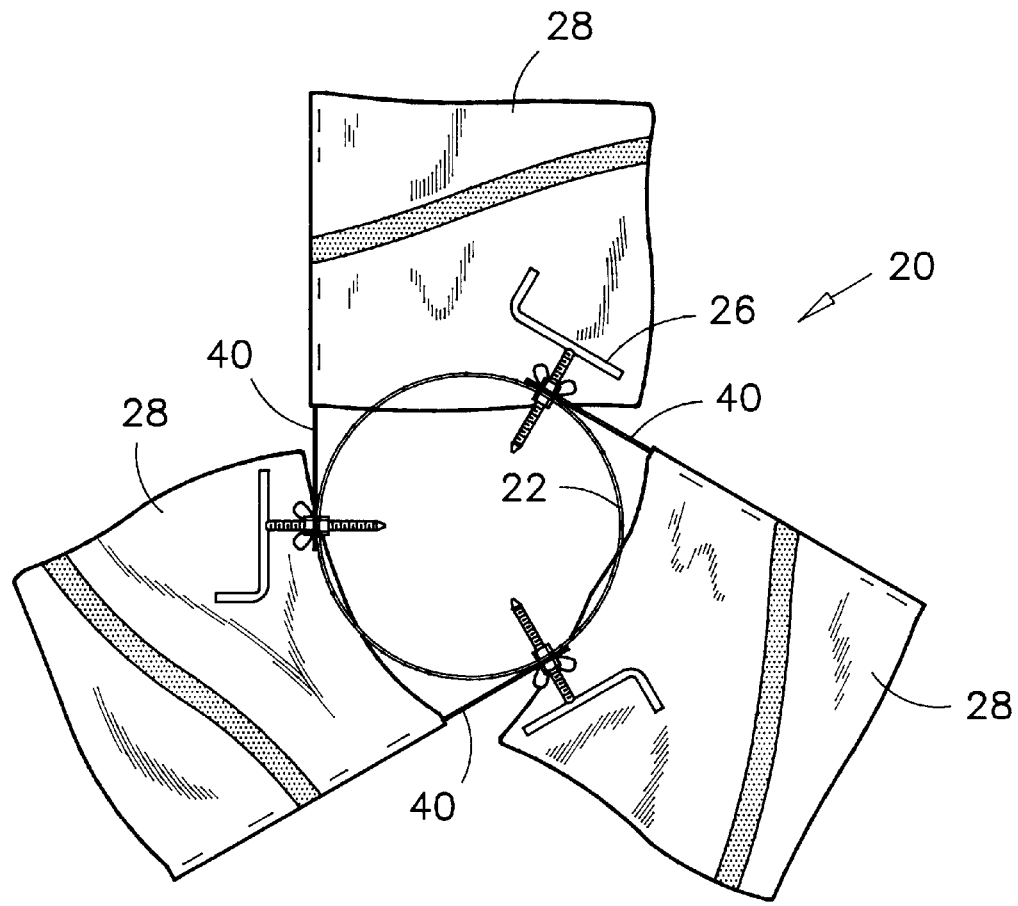
FIG. 2 is a plan view of the tail flag assembly of the preferred embodiment.
Figure 3:
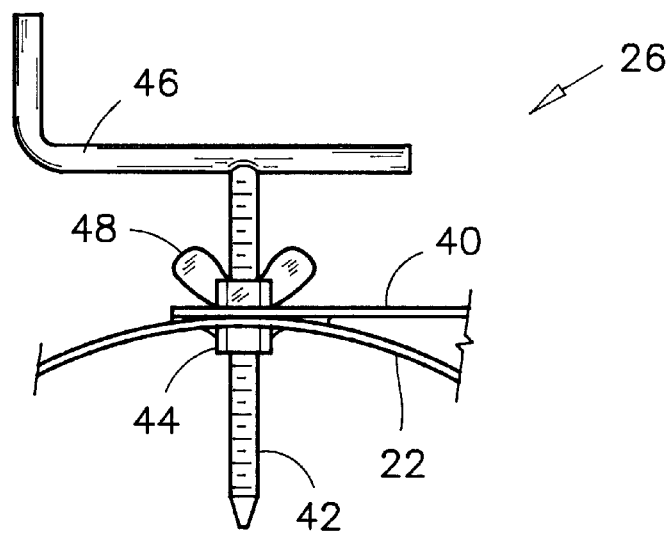
FIG. 3 is an enlarged view of a radial screw for retaining the tail flag assembly onto a pole.

Referring particularly to FIGS. 2 and 3, the staff 40 of each flag 28 is preferably welded to the ring 22. The ring 22 is preferably made of flat metal bar having cross-section dimensions of about ⅛ inch by 1¾ inch. The staff 40 of each flag is also preferably made of flat metal bar having cross-section dimensions of ⅛ inch by 1 inch and a length of about 18 inches.

Each radial screw 26 comprises a threaded stem 42, preferably having a pointed end to enter the surface of the pole and to positively retain the ring 22 to the pole 24 when the pole is made of wood for example. The stem 42 extends through the staff 40, the ring 22 and is threaded through a nut 44 welded inside the ring 22. The outside end of the stem 42 has a crank handle 46 welded perpendicularly thereto and extending as a crossbar on the outside end of the stem 42. The position of the stem 42 relative to the ring 22 is lockable by a wing nut 48 mounted between the ring 22 and the handle 46.

Figure 4:
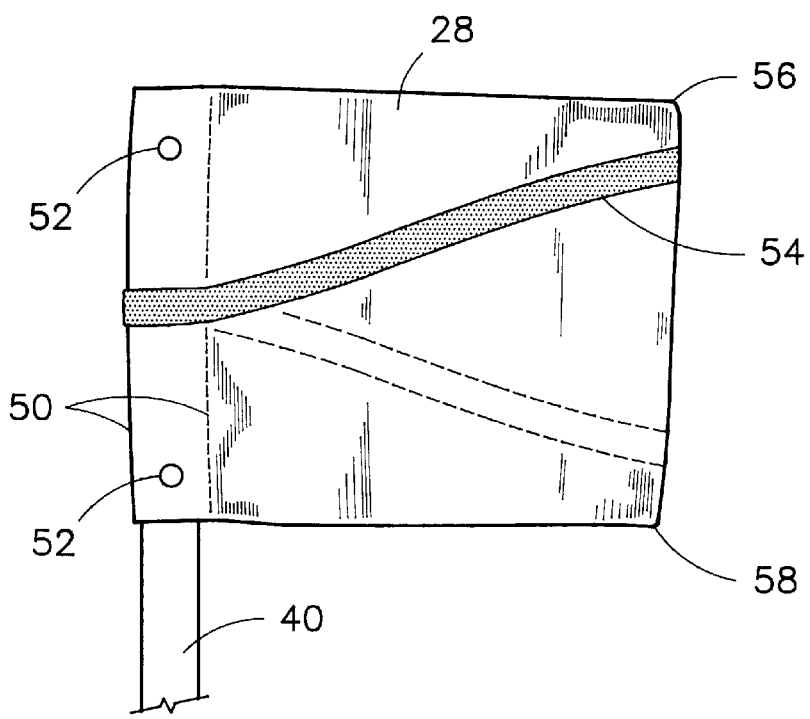
FIG. 4 is a plan view of one flag of the tail flag assembly of the preferred embodiment showing the layout of the light-reflecting stripe on both sides of the flag with the back side being shown in dashed lines.
Figures 5, 6:
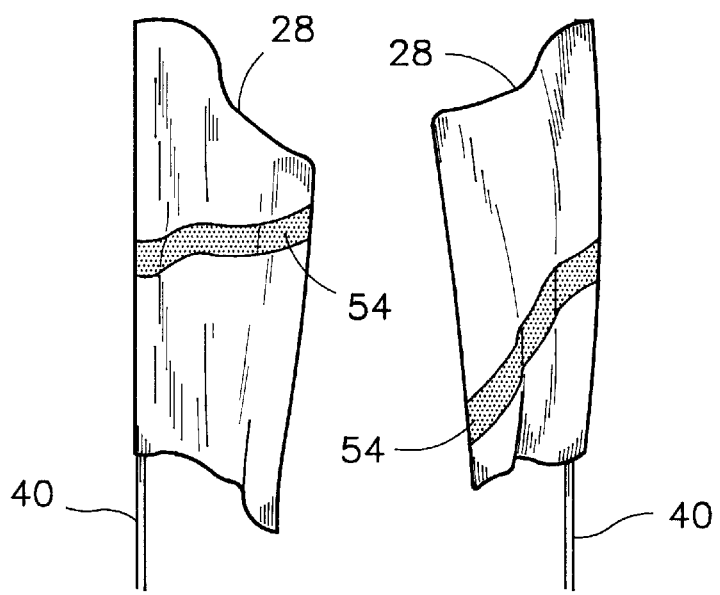
FIG. 5 is a first perspective rear view of one flag on the tail flag assembly of the preferred embodiment with the flag extending in a right direction relative to a following vehicle.
FIG. 6 is a second perspective rear view of one flag on the tail flag assembly of the preferred embodiment with the flag extending in a left direction relative to a following vehicle.

Referring now to FIGS. 4–6, each flag 28 has a hem 50 along one edge thereof. The flag 28 is affixed to the staff 40 by sliding the hem 50 onto the staff 40 and by fastening the flag 28 to the staff 40 with rivets 52 for example.

One important aspect of the flags 28 of the tail flag assembly of the preferred embodiment is that each flag 28 has a stripe 54 of light-reflecting fabric sewn thereon. The stripe 54 is preferably made of material of the type reflex-reflective fabric which is commonly used on clothing of firefighters and other security personnel working at night.

The reflective stripe 54 preferably has a width of about one inch. The stripe 54 is sewn over a first side of the flag from near an upper outside corner 56 of the flag 28 toward a midpoint on the hem 50. The stripe 54 further extends on the other side of the flag towards near the lower outside corner 58 of the flag 28.

When the flag flaps in the wind, the reflective stripe alternates from a first alignment to a second alignment when viewed from behind. At night, when the flag is illuminated by the headlights of a vehicle, the flip-flopping of the stripe causes a similar effect as a flashing light bar, thereby greatly increasing the visibility of the flag 28.

Figure 7:
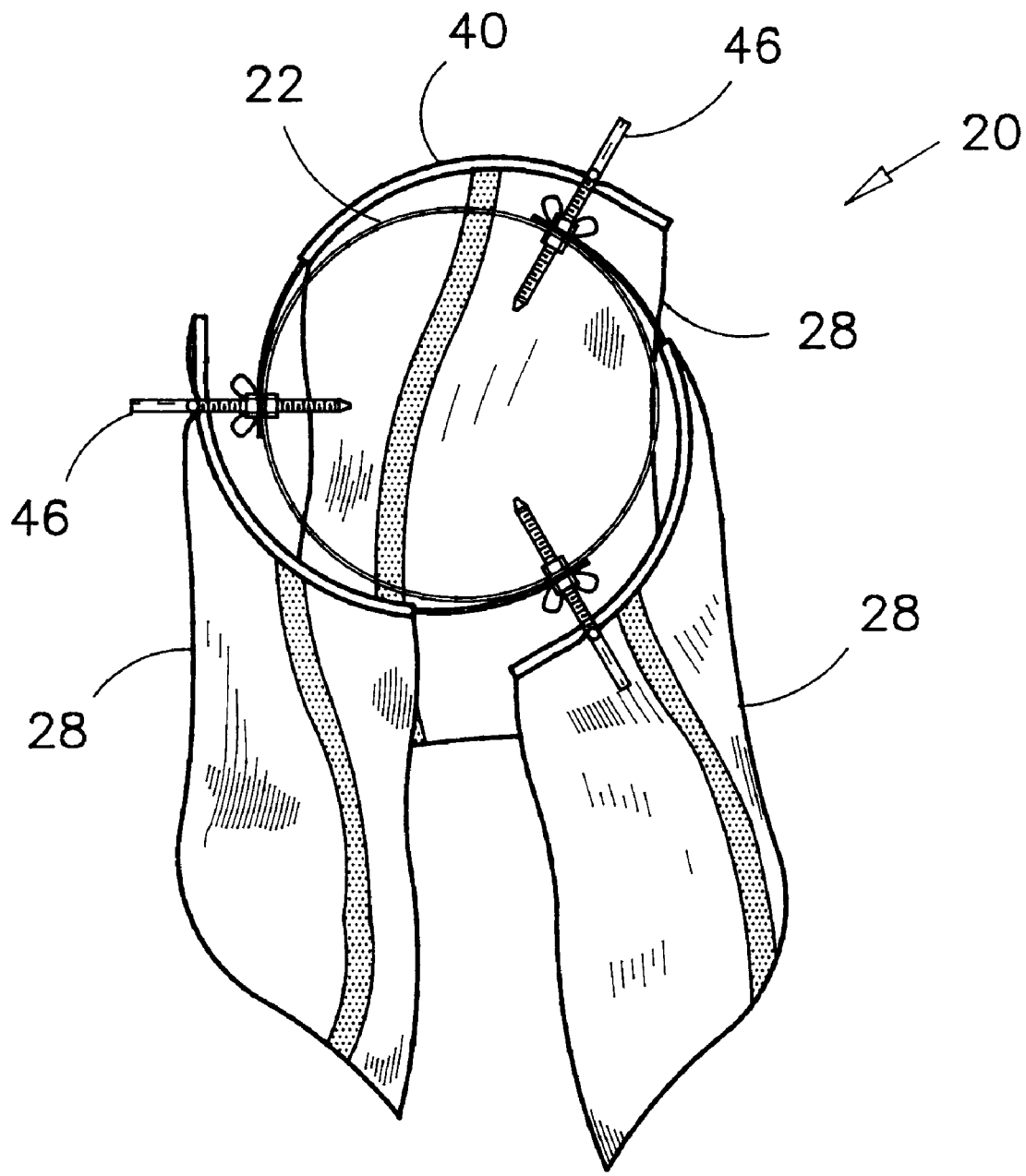
FIG. 7 is a plan view of the tail flag assembly of the preferred embodiment with the staffs shown in a stowable mode, each being engaged under an adjacent crossbar handle.

Referring now to FIG. 7, the staff 40 of each flag 28 is preferably made of spring steel such that they are flexible to the point where they can be bent without permanent deformation, to engage under the adjacent crank handle 46 when the crank-handle is rotated substantially at right angle with the plane of the ring 22. When all staffs 40 are bent in this position, the tail flag assembly of the preferred embodiment is relatively compact in size and is easily stowed in a storage compartment of an utility truck, or hung on one of the numerous cable-spool hooks of a power utility truck.

While the above description provides a fill and complete disclosure of the preferred embodiment of this invention, various modifications, alternate constructions and equivalents may be employed and various uses may be devised without departing from the true spirit and scope of the invention. Such changes might involve alternate components, structural arrangements, construction features or the like. Therefore, the above description and the illustrations should not be construed as limiting the scope of the invention which is defined by the appended claims.

I claim:

1. A tail flag assembly for installation on an end of a utility pole laid on a pole trailer, comprising:

a ring made of a flat metal bar;

a plurality of spaced-apart flat metal staffs affixed to said ring and extending outwardly tangentially from said ring; each of said spaced-apart flat metal staffs having a flag affixed thereto; and a plurality of screws extending radially through said ring and inside said ring for clamping said ring to a utility pole; each of said screws also extending through one of said spaced-apart flat metal staffs and through a connection of one of said spaced-apart flat metal staffs to said ring;

such that said ring and said plurality of spaced-apart flat metal staffs are positively retainable to a utility pole.

2. The tail flag assembly as claimed in claim 1 wherein said plurality of spaced-apart flat metal staffs comprises three staffs.

3. The tail flag assembly as claimed in claim 2 wherein said three staffs in said plurality of spaced-apart flat metal staffs are spaced apart 120° around said ring.

4. The tail flag assembly as claimed in claim 1 wherein said ring has an inside diameter of about 12½ inches.

5. The tail flag assembly as claimed in claim 1 wherein said flag on each of said spaced-apart flat metal staffs has a surface area of at least about one square foot.

6. The tail flag assembly as claimed in claim 5 wherein each of said spaced-apart flat metal staffs has a length of about 18 inches.

7. The tail flag assembly as claimed in claim 1 wherein each of said screws has an inside end and an outside end relative to said ring and said inside end of each said screws includes a pointed end for penetrating a surface of a pole and for securing said ring to a pole.

8. The tail flag assembly as claimed in claim 7 wherein said outside end of each of said screws includes a crossbar mounted thereon for easing a turning of each of said screws.

9. The tail flag assembly as claimed in claim 8 wherein each of said screws also comprises a wing nut between said crossbar and said ring for locking a position thereof relative to said ring.

10. The tail flag assembly as claimed in claim 9 wherein said spaced-apart flat metal staffs are made of spring steel.

11. The tail flag assembly as claimed in claim 1 wherein said flag on each of said spaced-apart flat metal staffs has a stripe sewn across a surface thereof and said stripe is made of a highly light-reflecting material.

12. The tail flag assembly as claimed in claim 11 wherein said flag on each of said spaced-apart flat metal staffs is a rectangular flag having an inside edge and a hem along said inside edge enclosing an extremity of one of said spaced-apart flat metal staffs, each said rectangular flag also having an outside edge opposite said hem and upper and lower outside corners along said outside edge, wherein said stripe is sewn on a first side of said rectangular flag, from near said upper outside corner to a midpoint on said hem, and on a second side of said rectangular flag, from said midpoint on said hem to near said lower outside corner; such that a flip-flopping movement of said stripes when each said rectangular flag is flapping simulates a flashing light bar when said rectangular flag is being illuminated under nighttime conditions.

13. The tail flag assembly as claimed in claim 1, wherein said flat metal bar has cross-section dimensions of ⅛ inch by 1¾ inch, and each of said spaced-apart flat metal staffs has cross-section dimensions of ⅛ inch by 1 inch.

14. The tail flag assembly as claimed in claim 13, wherein each said connection of one of said spaced-apart flat metal staffs to said ring is a welded connection.

15. A tail flag assembly for installation on a utility pole laid on a pole trailer, comprising:

a ring made of a flat metal bar;

a plurality of spaced-apart flexible staffs affixed to said ring; and a plurality of screws extending radially through said ring and inside said ring for clamping said ring to a utility pole;

each of said screws having an inside end and an outside end relative to said ring, and said outside end of each of said screws having a crossbar mounted thereon;

each of said screws being threaded through said ring, with said crossbar on said outside end of each of said screws being proximate said ring and extending at a right angle with a plane of said ring;

each of said spaced-apart flexible staffs extending outwardly tangentially from said ring and being bent along said ring and engaged under said crossbar on said outside end on one of said screws;

such that said ring, said plurality of spaced-apart flexible staffs and said plurality of screws form a compact stowable arrangement.

16. The tail flag assembly as claimed in claim 15, wherein said plurality of spaced-apart flexible staffs comprises three flat metal staffs spaced apart 120 degrees around said ring.

17. The tail flag assembly as claimed in claim 16, wherein said flat metal bar of said ring has cross-section dimensions of ⅛ inch by 1¾ inch, and each of said spaced-apart flexible staffs has cross-section dimensions of ⅛ inch by 1 inch.

18. The tail flag assembly as claimed in claim 17, wherein each of said three flat metal staffs is welded to an outside surface of said ring, and each of said screws extends through a connection of one of said three flat metal staffs to said ring.

19. The tail flag assembly as claimed in claim 18 wherein said three flat metal staffs are made of spring steel.

20. The tail flag assembly as claimed in claim 16 wherein each of said three flat metal staffs has a length of about 18 inches.

* * * * *